United States Patent [19]
Lawther et al.

[11] Patent Number: 5,729,773
[45] Date of Patent: Mar. 17, 1998

[54] CAMERA WITH MULTI-LAMP FLASH WHEEL

[75] Inventors: Joel Sherwood Lawther; Ralph Merwin Lyon, both of Rochester, N.Y.

[73] Assignee: Eastman Kodak Company, Rochester, N.Y.

[21] Appl. No.: 674,220

[22] Filed: Jun. 28, 1996

[51] Int. Cl.⁶ .................... G03B 15/03; G03B 15/02
[52] U.S. Cl. .................... 396/197; 396/172; 362/13
[58] Field of Search ........................ 354/148, 143; 396/192, 197; 362/3, 11, 13, 16, 18, 252

[56] References Cited

U.S. PATENT DOCUMENTS

| | | | |
|---|---|---|---|
| D. 313,422 | 1/1991 | Leonard et al. | D16/209 |
| 2,290,793 | 7/1942 | Alderman | 240/2 |
| 2,892,073 | 6/1959 | Michatek et al. | 396/197 |
| 3,087,318 | 4/1963 | Oswold | 396/197 |
| 3,866,033 | 2/1975 | Stacy et al. | 396/197 |
| 3,919,539 | 11/1975 | Winkler et al. | 396/197 |
| 3,935,442 | 1/1976 | Hanson | 240/1.3 |
| 4,085,436 | 4/1978 | Weiss | 362/16 |
| 4,279,488 | 7/1981 | Hines | 354/145 |
| 4,652,105 | 3/1987 | Angeli | 354/121 |
| 4,769,660 | 9/1988 | Heinrich | 354/120 |
| 4,921,344 | 5/1990 | Duplantis | 354/62 |
| 5,253,002 | 10/1993 | Kwak | 354/126 |
| 5,448,323 | 9/1995 | Clark et al. | 354/167 |

Primary Examiner—Safet Metjahic
Assistant Examiner—Michael Dalakis
Attorney, Agent, or Firm—Roger A. Fields

[57] ABSTRACT

A camera comprising an optical viewfinder with a pair of aligned front and rear lenses for viewing a subject to be photographed, and a multi-lamp flash wheel rotatable to move respective one-time-use flash lamps to a use position for illuminating the subject, is characterized in that the multi-lamp flash wheel has a lamp cover wheel which is transparent to transmit the illumination from each of the flash lamps in the use position, and the front lens is an integral centered portion of the lamp cover wheel.

7 Claims, 2 Drawing Sheets

CAMERA WITH MULTI-LAMP FLASH WHEEL

FIELD OF THE INVENTION

The invention relates generally to the field of photography, and in particular to camera with a multi-lamp flash wheel.

BACKGROUND OF THE INVENTION

Manufacturers often look for ways to make a camera relatively compact and inexpensive.

It is known for a camera to comprise an optical viewfinder with a pair of aligned front and rear lenses for viewing a subject to be photographed, and a separate replaceable multi-lamp flash wheel rotatable to move respective one-time-use flash lamps to a use position for illuminating the subject. This design, though inexpensive, is less than compact.

Conversely, U.S. Pat. No. 5,253,002, issued Oct. 12, 1993, discloses a repeated-use electronic flash unit that includes a pair of built-in front and rear viewfinder lenses. This design, though compact is not inexpensive.

SUMMARY OF THE INVENTION

A camera comprising an optical viewfinder with a pair of aligned front and rear lenses for viewing a subject to be photographed, and a multi-lamp flash wheel rotatable to move respective one-time-use flash lamps to a use position for illuminating the subject, is characterized in that:

the multi-lamp flash wheel has a lamp cover wheel which is transparent to transmit the illumination from each of the flash lamps in the use position, and the front lens is an integral centered portion of the lamp cover wheel.

DETAILED DESCRIPTION OF THE INVENTION

The invention is disclosed as being embodied preferably in a camera with a multi-lamp flash wheel. Because the features of a camera with a multi-lamp flash wheel are generally known, the description which follows is directed in particular only to those elements forming part of or cooperating directly with the disclosed embodiment. It is to be understood, however, that other elements may take various forms known to a person of ordinary skill in the art.

Figure 1:
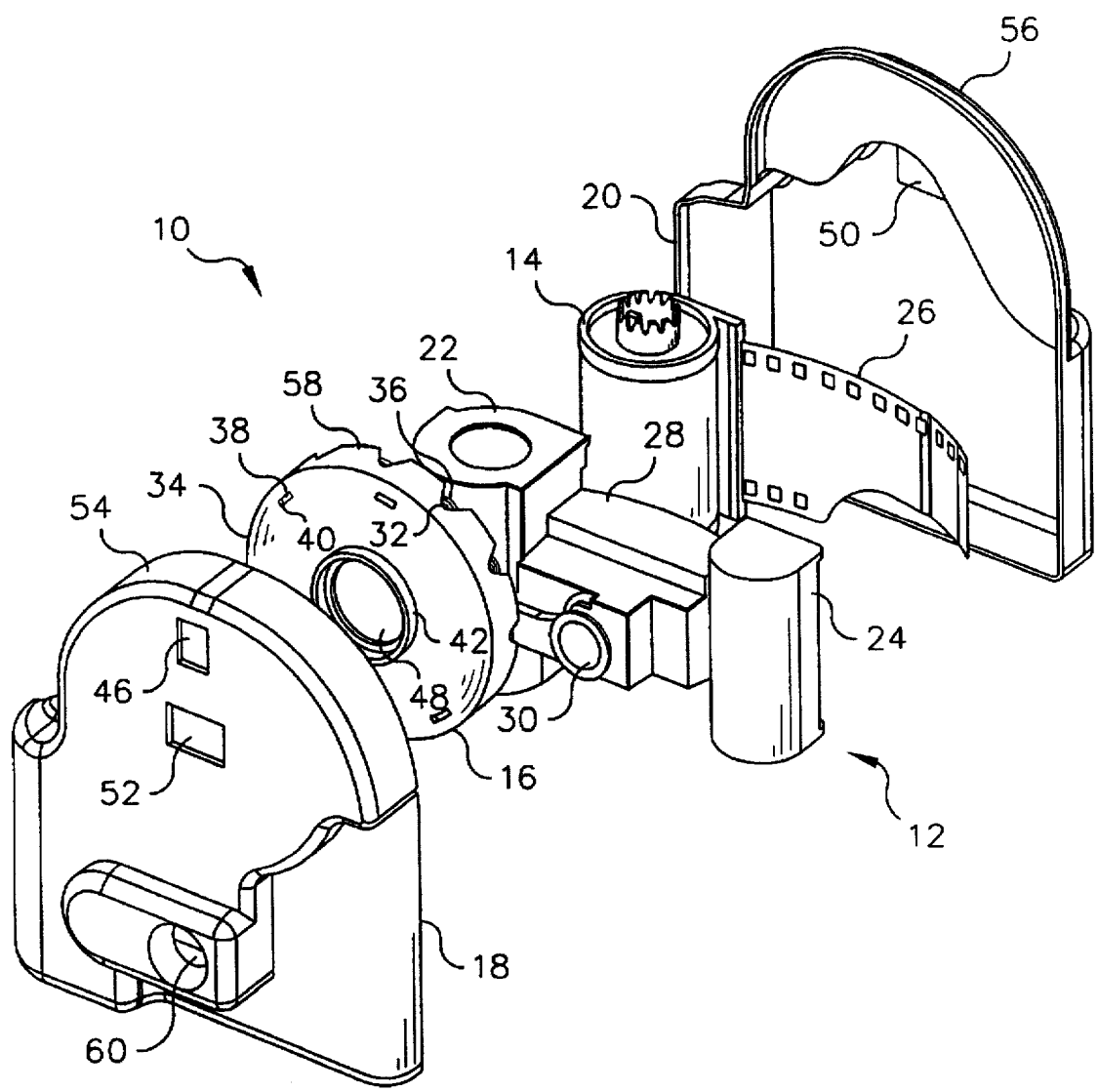
FIG. 1 is an exploded perspective view of a camera according to a preferred embodiment of the invention.
Figure 2:
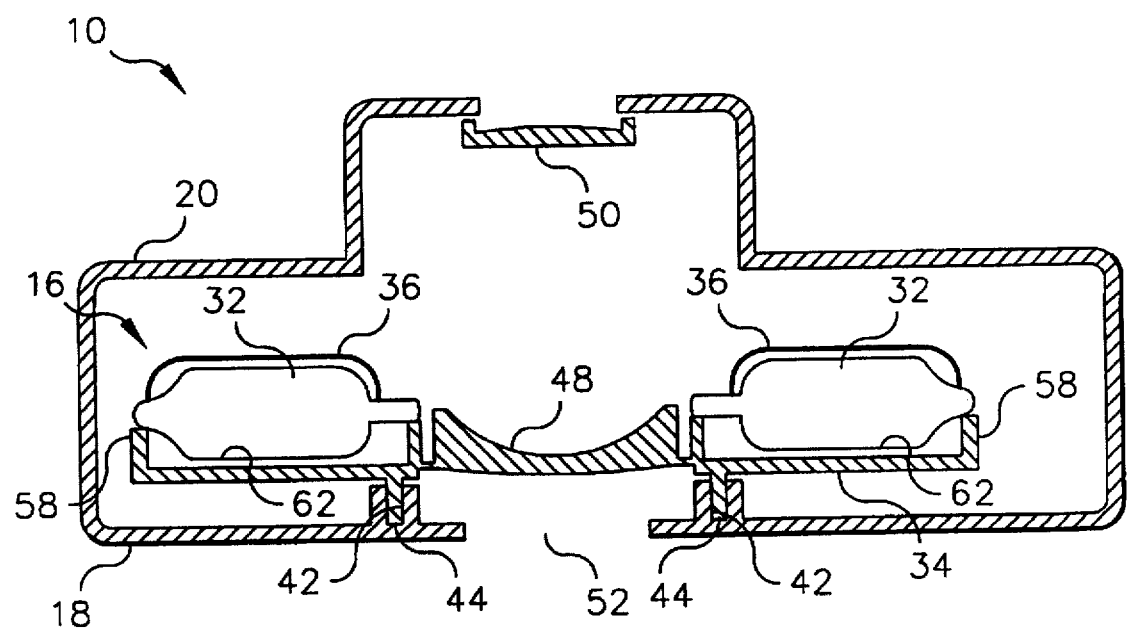
FIG. 2 is a sectional view of an upper portion of the camera.

Referring now to the drawings, FIGS. 1 and 2 show a camera 10 comprising a main body section 12, a known 35 mm film cartridge 14, and a multi-lamp flash wheel 16, enclosed within a front housing section 18 and a rear housing section 20 which are secured together.

The main body section 12 has a open-top cartridge chamber 22 for the film cartridge 14, a film roll chamber 24 into which an unexposed filmstrip 26 is prewound from the film cartridge during manufacture of the camera 10, and a film exposure chamber 28 interconnecting the cartridge chamber and the film roll chamber. A taking lens 30 is supported over a front opening in the main body section 12 to the film exposure chamber 28.

The multi-lamp flash wheel 16 includes a circular array of one-time-use flash lamps 32 which are sandwiched between a front lamp cover wheel 34 and a rear flash reflector ring 36. The flash reflector ring 36 has several integrally formed stems or hooks 38 that are engaged in respective slots 40 in the lamp cover wheel 34 to securely hold the flash lamps 32 in their circular array. As shown in FIG. 2, the lamp cover wheel 34 has an annular protuberance 42 that is received in a correspondingly-shaped support slot 44 on the inside of the front housing section 18 to rotationally support the multi-lamp flash wheel 16 to move the respective lamps 32 to a use position behind a flash emission opening 46 in the front housing section.

The lamp cover wheel 34 is transparent to transmit the illumination from each of the flash lamps 32 in the use position and has an integral formed front viewfinder lens 48 that is centered within the lamp's circular array at the axis of rotation of the multi-lamp flash wheel 16. See FIG. 2. The front viewfinder lens 48 is optically aligned with a rear viewfinder lens 50 fixed within a lens opening in the rear housing section 20 and is located behind a viewfinder opening 52 in the front housing section 18. See FIG. 1. Thus, rotation of the front viewfinder lens 48 with the multi-lamp flash wheel 16 has no affect when viewing a subject to be photograhed through the front and rear viewfinder lenses.

As shown in FIG. 1, the front and rear housing sections 18 and 20 have respective top portions 54 and 56 that are similarly curved in respective arcs to conform with a circular periphery 58 of the lamp cover wheel 32. The front housing section 18 includes a retractable split-cover 60 for the taking lens 30.

As shown in FIG. 2, respective known Fresnel lenses 62 or the like are integrally formed on the lamp cover wheel 34 opposite the flash lamps 32.

The invention has been described with reference to a preferred embodiment. However, it will be appreciated that variations and modifications can be effected by a person of ordinary skill in the art without departing from the scope of the invention. For example, in place of the front viewfinder lens 48 on the lamp cover wheel 34, the camera 10 could be redesigned to provide the taking lens 30 in place of the front viewfinder lens.

PARTS LIST 10. camera
12. main body section
14. film cartridge
16. multi-lamp flash wheel
18. front housing section
20. rear housing section
22. cartridge chamber
24. film roll chamber
26. unexposed filmstrip
28. film exposure chamber
30. taking lens
32. flash lamps
34. lamp cover wheel
36. flash reflector ring
38. stems
40. slots
42. annular protuberance
44. corresponding support slot
46. flash emission opening
48. front viewfinder lens 50. rear viewfinder lens
52. viewfinder opening
54. top portion
56. top portion
58. circular periphery
60. split-cover
62. Fresnel lenses

What is claimed is:

1. A camera comprising an optical viewfinder with a pair of aligned front and rear lenses for viewing a subject to be photographed, and a multi-lamp flash wheel rotatable to move respective one-time-use flash lamps to a use position for illuminating the subject, is characterized in that:

said multi-lamp flash wheel has a lamp cover wheel which is transparent to transmit the illumination from each of said flash lamps in the use position, and said front lens is an integral centered portion of said lamp cover wheel.

2. A camera as recited in claim 1, wherein said flash lamps are arranged on said lamp cover wheel in a circular array relative to said front lens.

3. A camera as recited in claim 2, wherein a front housing section has an opening for said front lens and an annular support around said opening which supports said lamp cover wheel for rotation of said multi-lamp flash wheel.

4. A camera as recited in claim 1, wherein front and rear housing sections have respective top portions that are similarly curved in respective arcs that conform with a circular periphery of said lamp cover wheel.

5. A rotatable multi-lamp flash wheel comprising a circular array of flash lamps, is characterized by:

a rotatable lamp cover wheel which is transparent to transmit the illumination from each of said flash lamps and which has at least one integral image-forming lens portion, constructed of the same material as said cover wheel, and means for being engaged to rotatably support said cover wheel and said flash lamps.

6. A multi-lamp flash wheel as recited in claim 5, wherein said at least one integral image-forming lens portion is a single lens portion that is centered relative to said circular array of flash lamps.

7. A multi-lamp flash wheel as recited in claim 5, wherein said at least one integral image-forming lens portion is a circular array of flash lens portions opposite said respective lamps.

* * * * *